US006490183B2

(12) United States Patent
Zhang (10) Patent No.: US 6,490,183 B2
(45) Date of Patent: Dec. 3, 2002

(54) METHOD AND APPARATUS FOR MINIMIZING NEGATIVE CURRENT BUILD UP IN DC-DC CONVERTERS WITH SYNCHRONOUS RECTIFICATION

(75) Inventor: Jun Zhang, Garland, TX (US)

(73) Assignee: Ericsson, Inc., Plano, TX (US)

( * ) Notice: Subject to any disclaimer, the term of this patent is extended or adjusted under 35 U.S.C. 154(b) by 0 days.

(21) Appl. No.: 09/940,971

(22) Filed: Aug. 28, 2001

(65) Prior Publication Data

US 2002/0085402 A1 Jul. 4, 2002

Related U.S. Application Data

(60) Provisional application No. 60/258,951, filed on Dec. 29, 2000.

(51) Int. Cl.[7] .............................................. H02M 7/04
(52) U.S. Cl. ........................................ 363/89; 363/127
(58) Field of Search ............................ 363/24, 25, 81, 363/84, 89, 125, 127

(56) References Cited

U.S. PATENT DOCUMENTS

| | | | |
|---|---|---|---|
| 5,870,299 A | 2/1999 | Rozman | 363/127 |
| 5,940,287 A | 8/1999 | Brkovic | 363/127 |
| 6,038,148 A | 3/2000 | Farrington et al. | 363/21 |
| 6,111,769 A | 8/2000 | Zhang et al. | 363/127 |
| 6,151,233 A | 11/2000 | Kondo | 363/125 |
| 6,188,592 B1 * | 2/2001 | Farrington et al. | 363/98 |
| 6,191,964 B1 * | 2/2001 | Boylan et al. | 363/89 |

FOREIGN PATENT DOCUMENTS

| WO | WO 01 03277 A | 1/2001 |
|---|---|---|

OTHER PUBLICATIONS

Patent Abstracts of Japan vol. 1997, No. 12, Dec. 25, 1997 & JP 09 2247371 A (Origin Electric Co Ltd;Nippon Telegr & AMP; Teleph Corp & LT;NTT>), Aug. 26, 1997 abstract.
Patent Abstracts of Japan vol. 2000, No. 08, Oct. 6, 2000 & JP 2000 139074 A (Shindengen Electric Mfg Co Ltd), May 16, 2000 abstract.
Boonyaroonate, I. et al., Isolated DC–DC Converter Using PWM Synchronous Rectifier, 2000—IEEE International Symposium on Circuits and Systems, pp. I–252–255, May 28–31 2000, Geneva Switzerland.
Tabisz, W. et al., A Mosfet Resonant Synchronous Rectifier for High–Frequency DC/DC Converters, 1990—IEEE, pp. 769–779.

* cited by examiner

Primary Examiner—Adolf Deneke Berhane
(74) Attorney, Agent, or Firm—Gardere Wynne Sewell, LLP; Daniel Chalker; Ronald Burns (57) ABSTRACT

The present invention provides to a method and apparatus for minimizing or preventing negative current build up in DC-DC converters with synchronous rectification. The method turns the first synchronous rectifier off when the negative current is present in the first secondary winding and the first synchronous rectifier is on, and turns the second synchronous rectifier off when the negative current is present in the second secondary winding and the second synchronous rectifier is on.

24 Claims, 5 Drawing Sheets

METHOD AND APPARATUS FOR MINIMIZING NEGATIVE CURRENT BUILD UP IN DC-DC CONVERTERS WITH SYNCHRONOUS RECTIFICATION

RELATED APPLICATIONS

This application claims priority to U.S. Provisional Application Serial No. 60/258,951 filed on Dec. 29, 2000, the disclosure of which is herein incorporated by reference.

FIELD OF THE INVENTION

The present invention relates generally to the field of logic integrated circuits and, more particularly, to a new DC-DC converter with synchronous rectification that prevents or minimizes negative current build up.

BACKGROUND OF THE INVENTION

The supply voltage of integrated circuits used in electronic devices, such as computer and communications equipment, has decreased from 5 volts to 2.5 volts or, in some cases, to 1.5 volts. Since the number of transistors in these integrated circuits has increased, the output current demand of the DC-DC converters has increased accordingly. The low output voltage DC-DC converter with the traditional Schottky diode rectifiers suffers from low efficiency and high power loss. Synchronous rectification technology has improved the efficiency of DC-DC converters significantly, especially as related to the low voltage output. However, the synchronous rectification has added more complexity to the DC-DC converter circuit. It has also made the system design more difficult because the DC-DC converter with rectification can sink current from secondary to primary. Because of this, the synchronous rectifiers have a common problem: they need a parallel tool converter, such as O-ring diodes, to allow parallel connection of the converters. Without the O-ring diode, one converter can sink the current from another converter, possibly destroying the second converter because the current can go as high as 20 or 30 amps. The O-ring diode restricts the direction of the current. However, the O-ring diode decreases system efficiency.

One technique to prevent the synchronous rectifier DC-DC converters from sinking current from the secondary involves monitoring the current through the synchronous rectifier. When this current reaches a predefined level, the converter turns off its synchronous rectifier and then relies on the body (switch) diode to conduct current. This technique works very well, but adds complexity to the circuit. Accordingly, there is a need for a simple circuit that will minimize or prevent the converter from sinking current.

SUMMARY OF THE INVENTION

The present invention provides a new circuit to enable to parallel the bridge type DC-DC converter with synchronous rectification. It is applicable to various types of DC-DC converters, including push-pull, full bridge and half bridge. The present invention provides a simple circuit that will minimize or prevent the converter from sinking current. As a result, the present invention eliminates unnecessary power dissipation, reduces potential damage to the converter and allows parallel operation of the converters. Although the present invention is described below in reference to a half bridge rectifier, the present invention can be implemented for full-bridge and push-pull topologies. In addition, the present invention is particularly useful in portable electronic devices, such as computers, personal data assistants and communication devices.

As an example, the operation of the present invention is described in relation to a half bridge DC-DC converter. When there is no load on the secondary, the average current through the output inductor is zero. In the free wheeling stage, both synchronous rectifiers are on, allowing the inductor current to flow in the negative direction. When there is a voltage source higher than the converter's regulated voltage, the converter tries to reduce its duty cycle. Therefore, the primary MOSFET is turned off and the secondary MOSFET is turned on. At this point, the secondary rectifiers operate as if they are in the free wheeling stage. The duty cycle of the off state for the primary MOSFET is longer than the normal operation, allowing the inductor current to build up in the negative direction. The current in the transformer flows in the negative direction with respect to its normal operation. Once the primary MOSFET is turned off, the current flows through its body diode. At this time, the polarity and magnitude of the transformer is the same as before. The converter is sinking current from the secondary to the primary. In order to prevent the converter from sinking current from the secondary, the current must not be allowed to build up in the negative direction. This can be accomplished by adding a pair of switches.

The additional switches turn off the synchronous rectifiers at the appropriate time to prevent the negative current buildup in the inductor. When the current feeds back from the secondary to the primary, the effective duty cycle of the transformer is actually higher than the duty cycle of the converter feedback from the primary. By using that condition as a signal to connect to a switch that pulls the gate voltage of the synchronous rectifiers low, the current feedback from the secondary to the primary can be kept from reaching a significant level. There may still be some feedback. However, it should not exceed a half amp. This enables paralleling without the O-ring diode.

The present invention thus provides a method for minimizing or preventing a build up of a negative current in a DC-DC converter having a first secondary winding coupled to a first synchronous rectifier and a second secondary winding coupled to a second synchronous rectifier by turning the first synchronous rectifier off when the negative current is present in the first secondary winding and the first synchronous rectifier is on, and turning the second synchronous rectifier off when the negative current is present in the second secondary winding and the second synchronous rectifier is on.

The present invention also provides a DC-DC converter having a DC source, a first capacitor and a second capacitor series coupled across the DC source, a first primary switch and a second primary switch series coupled across the DC source. A primary winding of a transformer is coupled between the first and second capacitors, and the first and second primary switches. A first and second secondary winding of the transformer are coupled together. A first synchronous rectifier is coupled between the first secondary winding and a ground, and a second synchronous rectifier is coupled between the second secondary winding and the ground. An external driver is coupled to and provides timing signals to the first primary switch, the second primary switch and a DC level shifter. A first totem pole driver is coupled between the DC level shifter and the first synchronous rectifier, and a second totem pole driver is coupled between the DC level shifter and the second synchronous rectifier. A first circuit is coupled to the external driver, a first totem pole driver and the first secondary winding wherein the first circuit turns the first synchronous rectifier off when a negative current is present in the first secondary winding and the first synchronous rectifier is on. A second circuit is coupled to the external driver, a second totem pole driver and the second secondary winding wherein the second circuit turns the first synchronous rectifier off when the negative current is present in the second secondary winding and the second synchronous rectifier is on.

Other features and advantages of the present invention will be apparent to those of ordinary skill in the art upon reference to the following detailed description taken in conjunction with the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates to logic integrated circuits and, more particularly, to a new DC-DC converter with synchronous rectification that prevents or minimizes negative current build up. As a result, the present invention eliminates unnecessary power dissipation, reduces potential damage to the converter and allows parallel operation of the converters. Although the present invention is described below in reference to a half bridge rectifier, the present invention can be implemented for full-bridge and push-pull topologies. In addition, the present invention is particularly useful in portable electronic devices, such as computers, personal data assistants and communication devices.

Figure 1:
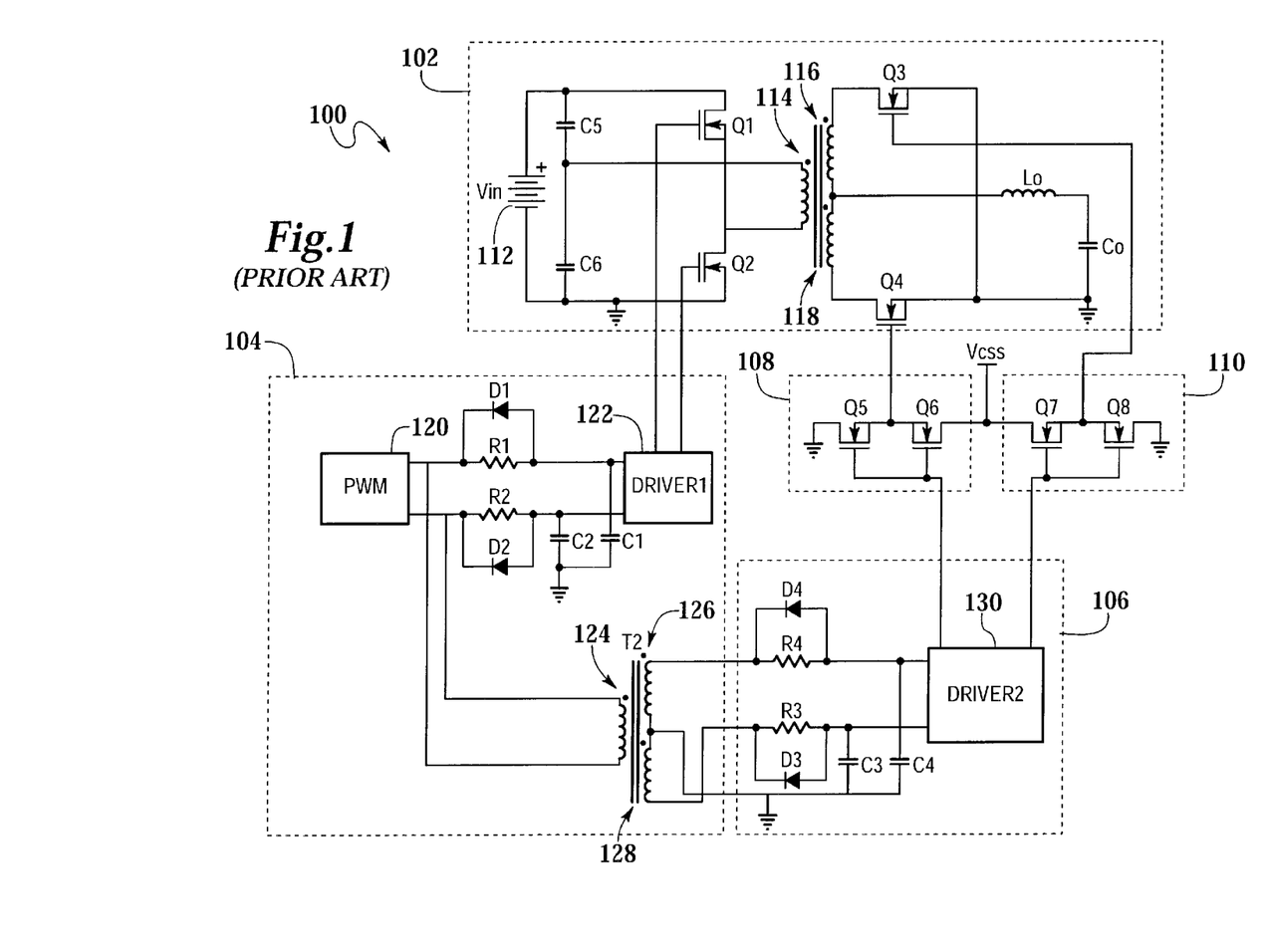
FIG. 1 is a schematic diagram for a half-bridge DC-DC converter with synchronous rectification in accordance with the prior art.

Referring to FIG. 1, a schematic diagram for a half-bridge DC-DC converter 100 with synchronous rectification in accordance with the prior art is shown. The converter 100 includes a converter/rectifier 102, an external driver 104, a DC level shifter 106, a first totem pole driver 108 and a second totem pole driver 110. The converter/rectifier 102 receives DC power from a DC source (Vin) 112. Capacitors C5 and C6 are series coupled across the DC source 112. First and second primary switches Q1, Q2 are also series coupled together across the DC source 112. The primary winding 114 of an isolation transformer T1 (also referred to as the first transformer) is coupled between the capacitors C5 and C6, and the first and second primary switches Q1, Q2.

First and second secondary windings 116, 118 of the isolation transformer T1 are coupled together. A first synchronous rectifier Q3 is coupled between the first secondary winding 116 and ground. A second synchronous rectifier Q4 is coupled between the second secondary winding 118 and ground. An output inductor Lo is coupled to the center tap between the first and second secondary windings 116, 118. An output capacitor Co is coupled between the output inductor Lo and ground. The timing or gate signals for the first and second synchronous rectifiers Q3 and Q4 are derived from the external driver 104, DC level shifter 106, and first and second totem pole drivers 108 and 110, as described below.

The external driver 104 includes a pulse-width modulator 120 coupled across a primary winding 124 of a pulse-transformer T2 (also referred to as the second transformer). The primary winding 124 has a first terminal and a second terminal (the high voltage terminal indicated by the dot). A diode D1 and resister R1 are parallel coupled between the first terminal of the primary winding 124 and a first terminal of the first driver 122. Capacitor C1 is coupled between the first terminal of the first driver 122 and ground. Similarly, diode D2 and resister R2 are parallel coupled between the second terminal of the primary winding 124 and a second terminal of the first driver 122. Capacitor C2 is coupled between the second terminal of the first driver 122 and ground. The first driver 122 is then coupled to the gate of each primary switch Q1, Q2 to control its operation (on/off).

In operation, resistors R1 and R2 and capacitors C1 and C2 delay the timing or gate signals generated by the pulse-width modulator 120. As a result, the appropriate synchronous rectifier Q3 or Q4 is turned off before the primary switch Q1 or Q2 is turned on. Primary switch Q1 is on when capacitor C1 is charged up. Likewise, primary switch Q2 is on when capacitor C2 is charged up.

The pulse transformer T2 transfers the timing or gate signals generated by the pulse-width modulator 120 to the DC level shifter 106. First and second secondary windings 126, 128 of the pulse transformer T2 are coupled together and to the DC level shifter 106. The center tap between the first and second secondary windings 126, 128 is coupled to ground. A diode D4 and resister R4 are parallel coupled between the first secondary winding 126 and a first terminal of a second driver 130. Capacitor C4 is coupled between the first terminal of the second driver 130 and ground. Similarly, diode D3 and resister R3 are parallel coupled between the second secondary winding 128 and a second terminal of the second driver 130. Capacitor C3 is coupled between the second terminal of the second driver 130 and ground. The second driver 130 is then coupled to the gate of synchronous rectifier Q3 via the first totem pole driver 108, and the gate of synchronous rectifier Q4 via the second totem pole driver 110 to control their operation (on/off).

In operation, resistors R3 and R4 and capacitors C3 and C4 delay the timing or gate signals generated by the pulse-width modulator 120. As a result, the appropriate synchronous rectifier Q3 or Q4 is turned on after the primary switch Q1 or Q2 is turned off. The second driver 130 is an inverted driver so that synchronous rectifier Q3 is off when capacitor C3 is charged up. Likewise, synchronous rectifier Q4 is off when capacitor C4 is charged up.

In the first totem pole driver 108, switch Q6 is coupled between the primary biasing voltage Vccs and the gate of synchronous rectifier Q4, and switch Q5 is coupled between the gate of synchronous rectifier Q4 and ground. The gates for switches Q5 and Q6 are coupled to the second driver 130. Similarly, in the second totem pole driver 110, switch Q7 is coupled between the primary biasing voltage Vccs and the gate of synchronous rectifier Q3, and switch Q8 is coupled between the gate of synchronous rectifier Q3 and ground. The gates for switches Q7 and Q8 are coupled to the second driver 130. Synchronous rectifier Q4 is turned on and off when the voltage of the first totem pole driver 108 is charged and discharged. Synchronous rectifier Q3 is turned on and off when the voltage of the second totem pole driver 110 is charged and discharged.

The first totem pole driver 108 may be utilized to provide high peak current to the synchronous rectifier Q4. The on-resistance of the n-channel MOSFET Q6 of the first totem pole driver 108 and the gate capacitance of synchronous rectifier Q3 are designed to allow the synchronous rectifier Q3 to turn on after the primary switch Q1 turns off. Likewise, the on-resistance of the n-channel MOSFET Q7 of the second totem pole driver 110 and the gate capacitance of synchronous rectifier Q4 are designed to allow the synchronous rectifier Q4 to turn on after the primary switch Q2 turns off. The delay time of and Q6 and Q7 can be controlled by selecting a specific on-resistance for the n-channel MOSFET Q7, Q8 or by placing a resister in series with Q7, Q8. The switches Q5, Q6, Q7 and Q8 of the first and second totem pole drivers 108, 110 are preferably smaller MOSFETs than the MOSFETs used as the first and second synchronous rectifiers Q3, Q4.

When there is no load on the converter secondary, the average current through the output inductor Lo is zero. In the free wheeling stage, both synchronous rectifiers Q3, Q4 are on, allowing the inductor current to flow in the negative direction. When there is a voltage source higher than the converter's regulated voltage, the converter 100 tries to reduce its duty cycle. So, the primary switches Q1, Q2 are turned off and the synchronous rectifiers Q3, Q4 are turned on. At this point, the synchronous rectifiers Q3, Q4 operate as if they are in the free wheeling stage. The duty cycle of the off state for the primary switches Q1, Q2 are longer than the normal operation, which allows the inductor current to build up in the negative direction. Thus, the current in the isolation transformer T1 flows in the negative direction with respect to its normal operation. Once the primary switches Q1, Q2 are turned off, the current flows through their body diodes. At this time, the polarity and magnitude of the isolation transformer T1 is the same as before. The converter 100 is, therefore, sinking current from the secondary to the primary, which produces unnecessary power dissipation and can destroy the converter 100.

Figure 2:
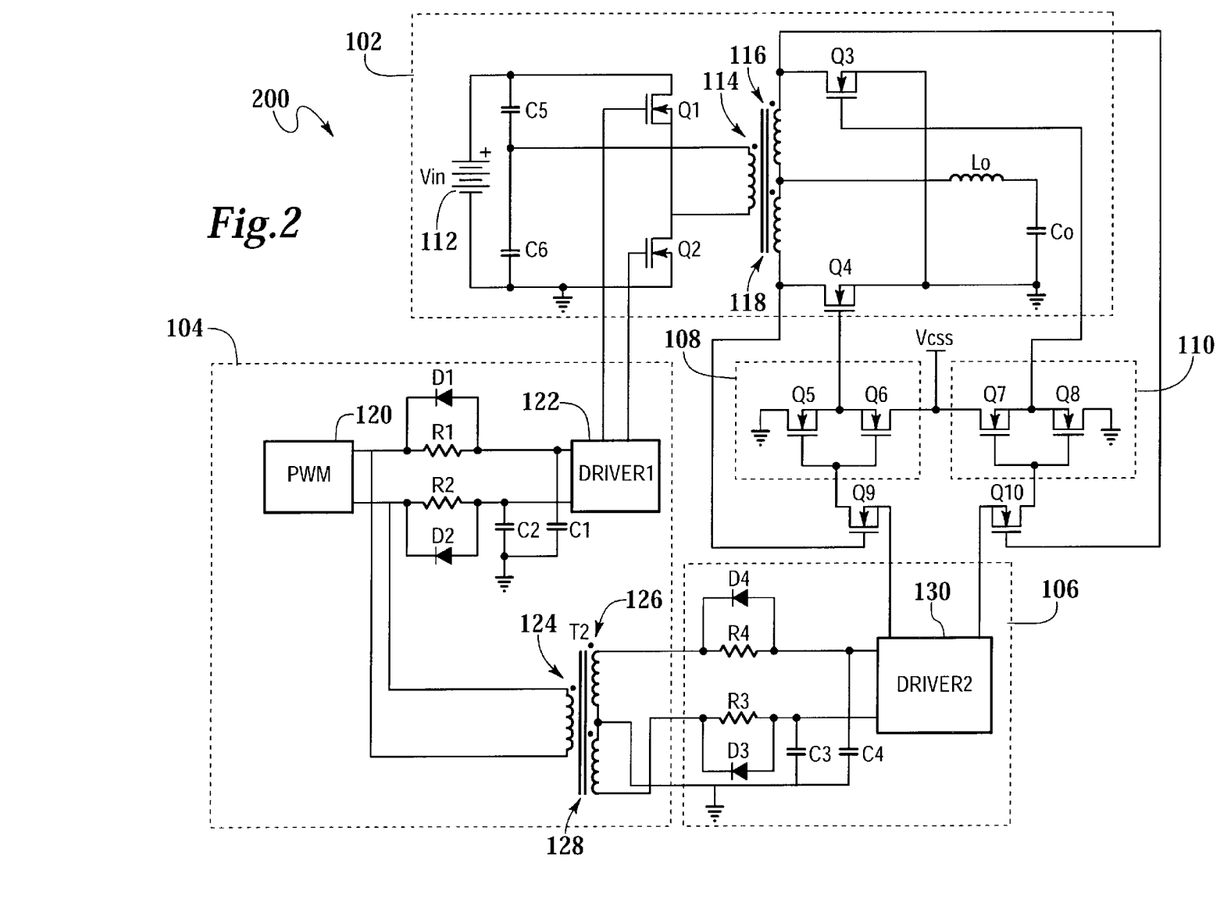
FIG. 2 is a schematic diagram for a half-bridge DC-DC converter with synchronous rectification in accordance with one embodiment of the present invention.

Now referring to one embodiment of the present invention, a schematic diagram for a half-bridge DC-DC converter 200 with synchronous rectification in accordance with the present invention is shown in FIG. 2. The converter 200 includes a converter/rectifier 102, an external driver 104, a DC level shifter 106, a first totem pole driver 108, a second totem pole driver 110, and switches Q9 and Q10. The converter/rectifier 102, external driver 104, DC level shifter 106, first totem pole driver 108 and second totem pole driver 110 were previously described in reference to FIG. 1. Switch Q9 is coupled between the DC level shifter 106 (specifically, the second driver 130) and the first totem pole driver 108 (specifically, the gates of switches Q5 and Q6). The gate of switch Q9 is coupled to the second secondary winding 118 of isolation transformer T1. Likewise, Switch Q10 is coupled between the DC level shifter 106 (specifically, the second driver 130) and the second totem pole driver 110 (specifically, the gates of switches Q7 and Q8). The gate of switch Q10 is coupled to the first secondary winding 116 of isolation transformer T1. Switches Q9 and Q10 are n-channel transistors and can be small signal MOSFETs.

When the current in the isolation transformer T1 flows in the negative direction with respect to normal operation, isolation transformer T1 has the same voltage across the winding even when the timing or gate signal of primary switches Q1 and Q2 is off. When the effective duty cycle of isolation transformer T1 is longer than the duty cycle of the primary switches Q1, Q2, either Q9 or Q10 will be turned off. As a result, switches Q9 and Q10 keep one respective synchronous rectifier Q3 or Q4 off by pulling the gate voltage of the synchronous rectifiers Q3 or Q4 low. In other words, when Q10 turns off, Q3 turns off. Likewise, when Q9 turns off, Q4 turns off. The current feedback from the secondary to the primary can, therefore, be kept from reaching a significant level. There may still be some feedback, but it should not exceed a half amp. This prevents the circuit 200 from going into the free wheeling stage and building up negative current. As a result, the present invention eliminates unnecessary power dissipation, reduces potential damage to the converter 200, and allows parallel operation of the converter 200 without using an O-ring diode.

The present invention thus provides a method for minimizing or preventing a build up of a negative current in a DC-DC converter having a first secondary winding coupled to a first synchronous rectifier and a second secondary winding coupled to a second synchronous rectifier by turning the first synchronous rectifier off when the negative current is present in the first secondary winding and the first synchronous rectifier is on, and turning the second synchronous rectifier off when the negative current is present in the second secondary winding and the second synchronous rectifier is on.

Figure 3:
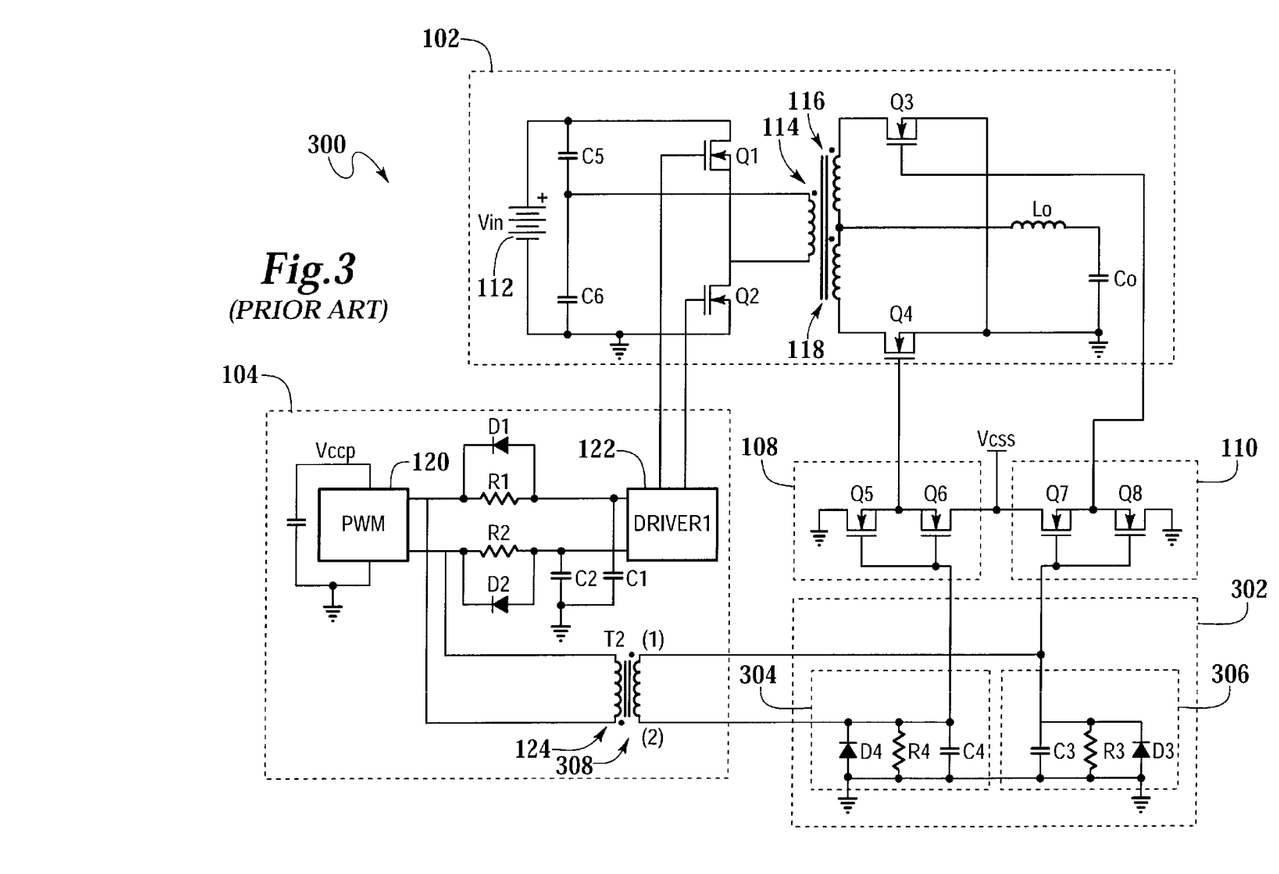
FIG. 3 is a schematic diagram for a half bridge DC-DC converter with an alternative method of synchronous rectification in accordance with the prior art.

Now referring to FIG. 3, a schematic diagram for a half bridge DC-DC converter 300 with an alternative method of synchronous rectification in accordance with the prior art is shown. The converter 300 includes a converter/rectifier 102, an external driver 104, a DC level shifter 302, a first totem pole driver 108 and a second totem pole driver 110. The converter/rectifier 102, external driver 104 (except that pulse transformer T2 is a two-winding transformer instead of a three-winding transformer), first totem pole driver 108 and second totem pole driver 110 were previously described in reference to FIG. 1. As in FIG. 1, the DC level shifter is coupled between the external driver 104 and the first and second totem pole drivers 108, 110.

The secondary winding 308 of the pulse transformer T2 has a first terminal (1) (the high voltage terminal indicated by the dot) and a second terminal (2). The DC level-shifter 302 includes a first switch driver 304 coupled to the second terminal (2) and a second switch driver 306 coupled to the first terminal (1). First switch driver 304 includes capacitor C4, resister R4 and diode D4, all of which are parallel coupled between the second terminal (2) and ground. The gates of switches Q5 and Q6 (first totem pole driver 108) are also coupled to the second terminal (2). Similarly, second switch driver 306 includes capacitor C3, resister R3 and diode D3, all of which are parallel coupled between the first terminal (1) and ground. The gates of switches Q7 and Q8 (first totem pole driver 110) are also coupled to the first terminal (1). The first and second switch drivers 304, 306 provide the appropriate timing or gate signal to the synchronous rectifiers Q3 and Q4, and eliminate the second driver 130 of FIG. 1.

Capacitor C3 provides storage of the circuit current to be discharged at the appropriate time in order to switch the synchronous rectifier Q3 on. In practical applications, capacitor C3 may not completely discharge, thus resistor R3 is added to fully discharge or bleed the capacitor C3. Diode D3 provides current paths depending of the signal swing at the first terminal (1). Capacitor C4, resistor R4 and diode D4 operate in the same manner.

In operation, when primary switch Q1 is on, the voltage at terminal (1) is high. Terminal (2) is clamped to ground by diode D4. Capacitor C3 is charged up, thus synchronous rectifier Q3 is on and synchronous rectifier Q4 is off. When primary switch Q1 turns off, the voltage across terminal (1) is zero, and capacitor C3 is discharged to capacitor C4 through the shorted winding until they reach the same voltage. The voltage of capacitor C4 and capacitor C3 are equal to half of the voltage originally on capacitor C3. This voltage is high enough to turn on synchronous rectifiers Q3 and Q4. At this time the converter is in freewheeling stage. Note that this DC level shifter 302 decreases the cost and size of the converter 300 while increasing the reliability of the converter 300.

When there is no load on the converter secondary, the average current through the output inductor Lo is zero. In the free wheeling stage, both synchronous rectifiers Q3, Q4 are on, allowing the inductor current to flow in the negative direction. When there is a voltage source higher than the converter's regulated voltage, the converter 300 tries to reduce its duty cycle. So, the primary switches Q1, Q2 are turned off and the synchronous rectifiers Q3, Q4 are turned on. At this point, the synchronous rectifiers Q3, Q4 operate as if they are in the free wheeling stage. The duty cycle of the off state for the primary switches Q1, Q2 are longer than the normal operation, which allows the inductor current to build up in the negative direction. Thus, the current in the isolation transformer T1 flows in the negative direction with respect to its normal operation. Once the primary switches Q1, Q2 are turned off, the current flows through their body diodes. At this time, the polarity and magnitude of the isolation transformer T1 is the same as before. The converter 300 is, therefore, sinking current from the secondary to the primary, which produces unnecessary power dissipation and can destroy the converter 300.

Figure 4:
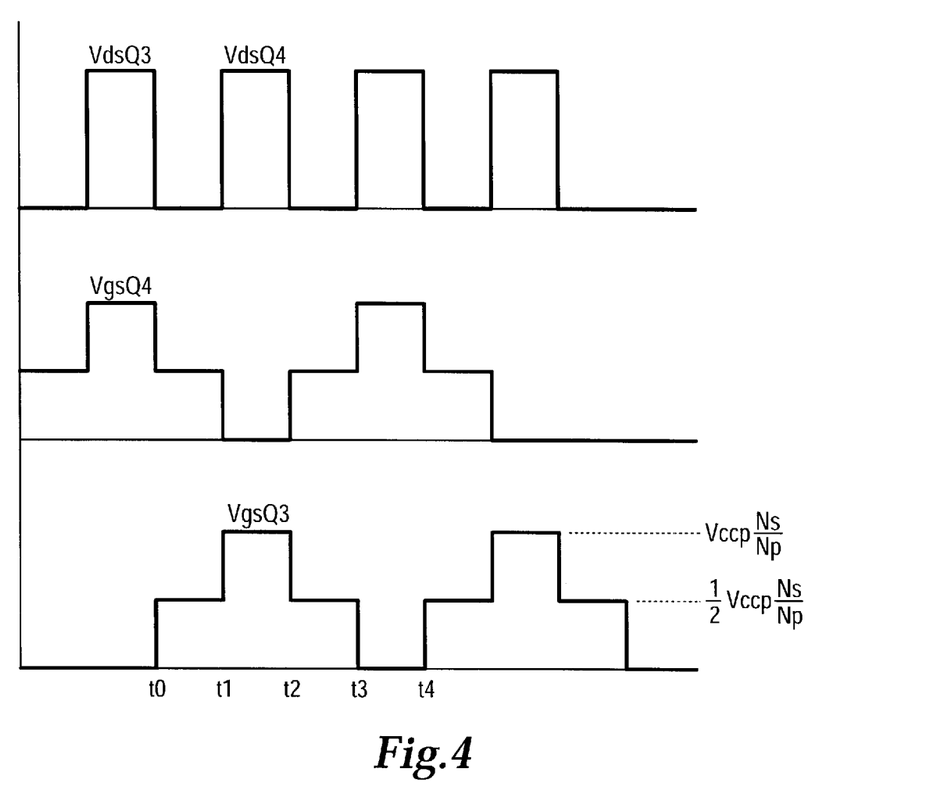
FIG. 4 is a graph of the basic voltage waveforms for the operation of DC-DC converter of FIG. 3.

Now referring to FIG. 4, the basic voltage waveforms for the operation of DC-DC converter 300 of FIG. 3 are shown. More specifically, the basic voltage waveforms on the drains and gates of Q3 and Q4, where Vccp is the primary basing voltage and Ns/Np is the gate transformer turns ratio are shown.

Figure 5:
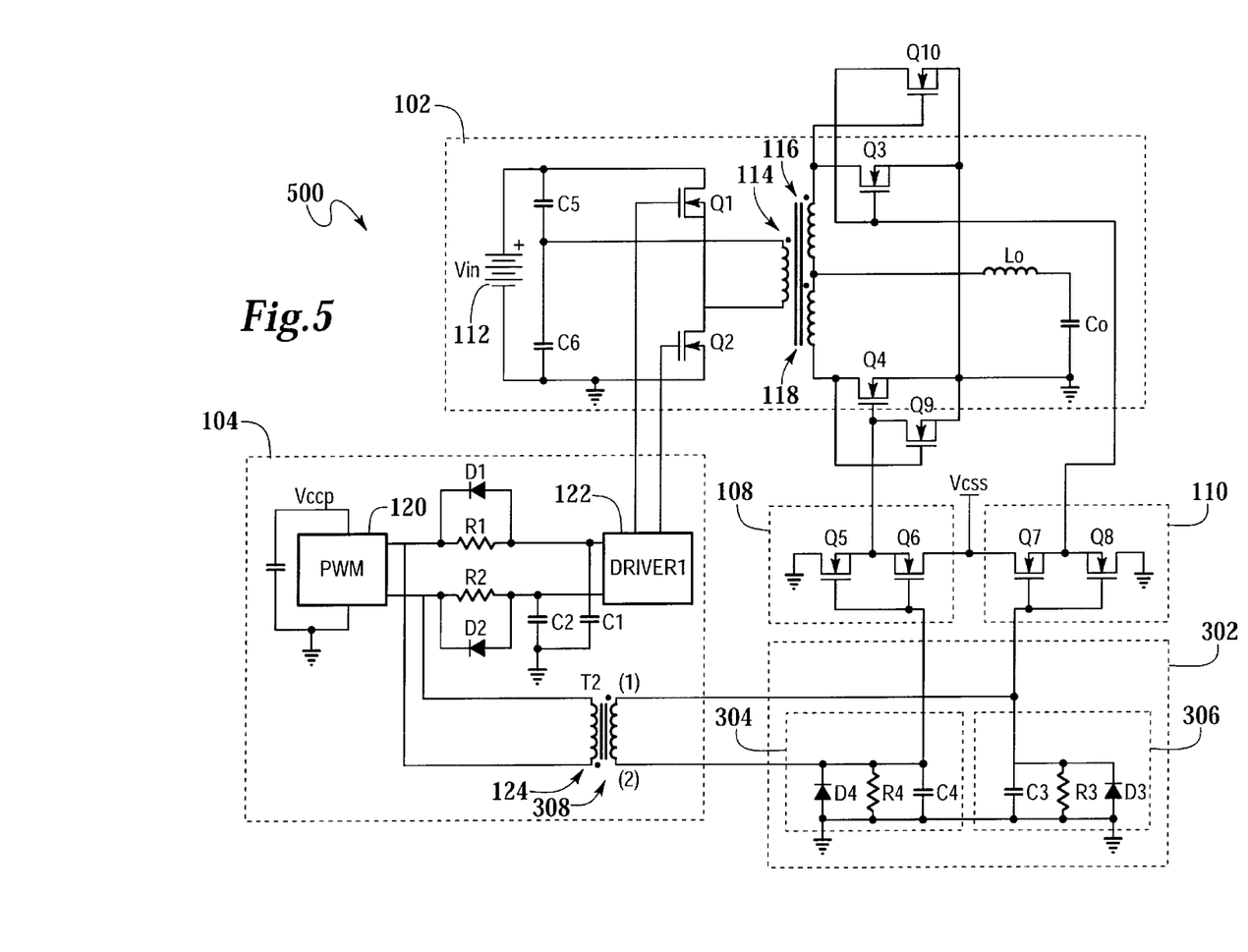
FIG. 5 is a schematic diagram for a half-bridge DC-DC converter with synchronous rectification in accordance with another embodiment of the present invention.

Referring now to another embodiment of the present invention, a schematic diagram for a half-bridge DC-DC converter 500 with synchronous rectification in accordance with the present invention is shown in FIG. 5. The converter 500 includes a converter/rectifier 102, an external driver 104, a DC level shifter 302, a first totem pole driver 108, a second totem pole driver 110, and switches Q11 and Q12. The converter/rectifier 102, external driver 104, DC level shifter 302, first totem pole driver 108 and second totem pole driver 110 were previously described in reference to FIG. 3. Switch Q9 is coupled between the gate of synchronous rectifier Q4 and ground. The gate of switch Q9 is coupled to the second secondary winding 118 of isolation transformer T1. Likewise, Switch Q10 is coupled between the gate of synchronous rectifier Q3 and ground. The gate of switch Q10 is coupled to the first secondary winding 116 of isolation transformer T1. Q9 and Q10 are p-channel transistors and can be small signal MOSFETs.

When the current in the isolation transformer T1 flows in the negative direction with respect to normal operation, isolation transformer T1 has the same voltage across the winding even when the timing or gate signal of primary switches Q1 and Q2 is off. When the effective duty cycle of isolation transformer T1 is longer than the duty cycle of the primary switches Q1, Q2, either Q9 or Q10 will be turned on. As a result, Q9 and Q10 keep one respective synchronous rectifier Q3 or Q4 off by grounding the gate of Q3 or Q4. In other words, when Q9 turns on, Q3 turns off. Likewise, when Q10 turns on, Q4 turns off. This prevents the circuit 500 from going into the free wheeling stage and building up negative current. As a result, the present invention eliminates unnecessary power dissipation, reduces potential damage to the converter 500, and allows parallel operation of the converter 500. Resistor dividers can be added to the gates of Q9 and Q10 to help minimize the possibility of destroying Q9 and Q10.

Although preferred embodiments of the present invention have been described in detail, it will be understood by those skilled in the art that various modifications can be made therein without departing from the spirit and scope of the invention as set forth in the appended claims.

What is claimed is:

1. A method for minimizing or preventing a build up of a negative current in a DC-DC converter having a first secondary winding coupled to a first synchronous rectifier and a second secondary winding coupled to a second synchronous rectifier, the method comprising the steps of:
   turning the first synchronous rectifier off when the negative current is present in the first secondary winding and the first synchronous rectifier is on; and
   turning the second synchronous rectifier off when the negative current is present in the second secondary winding and the second synchronous rectifier is on.

2. The method as recited in claim 1 wherein the first synchronous rectifier and the second synchronous rectifier are MOSFETs.

3. The method as recited in claim 1 wherein:
   the first synchronous rectifier is turned off by turning a first switch off when the negative current is present in the first winding, the first switch coupled between the gate of the first synchronous rectifier and a DC level shifter, and the gate of the first switch is coupled to the first secondary winding; and
   the second synchronous rectifier is turned off by turning a second switch off when the negative current is present in the second winding, the second switch coupled between the gate of the second synchronous rectifier and the DC level shifter, and the gate of the second switch is coupled to the second secondary winding.

4. The method as recited in claim 3 wherein the first switch and second switch are MOSFETs.

5. The method as recited in claim 3 wherein the first switch and second switch are n-channel transistors.

6. The method as recited in claim 1 wherein:
   the first synchronous rectifier is turned off by turning a first switch on when the negative current is present in the first winding, the first switch coupled between the gate of the first synchronous rectifier and a ground, and the gate of the first switch is coupled to the first secondary winding; and
   the second synchronous rectifier is turned off by turning a second switch on when the negative current is present in the second winding, the second switch coupled between the gate of the second synchronous rectifier and the ground, and the gate of the second switch is coupled to the second secondary winding.

7. The method as recited in claim 6 wherein the first switch and second switch are MOSFETs.

8. The method as recited in claim 6 wherein the first switch and second switch are p-channel transistors.

9. A DC-DC converter comprising:

a DC source;

a first capacitor and a second capacitor series coupled across the DC source;

a first primary switch and a second primary switch series coupled across the DC source;

a primary winding of a transformer coupled between the first and second capacitors, and the first and second primary switches;

a first and second secondary winding of the transformer coupled together;

a first synchronous rectifier coupled between the first secondary winding and a ground;

a second synchronous rectifier coupled between the second secondary winding and the ground;

an external driver coupled to and providing timing signals to the first primary switch, the second primary switch and a DC level shifter;

a first totem pole driver coupled between the DC level shifter and the first synchronous rectifier;

a second totem pole driver coupled between the DC level shifter and the second synchronous rectifier;

a first circuit coupled to the first totem pole driver and the first secondary winding, the first circuit turning the first synchronous rectifier off when a negative current is present in the first secondary winding and the first synchronous rectifier is on; and a second circuit coupled to the second totem pole driver and the second secondary winding, the second circuit turning the first synchronous rectifier off when the negative current is present in the second secondary winding and the second synchronous rectifier is on.

10. The DC-DC converter as recited in claim 9 further comprising:

an output inductor coupled to a center tap between the first and second secondary windings; and an output capacitor coupled between the output inductor and the ground.

11. The DC-DC converter as recited in claim 9 wherein the first primary switch, the second primary switch, the first synchronous rectifier and the second synchronous rectifier are MOSFETs.

12. The DC-DC converter as recited in claim 11 wherein:

the first circuit comprises a first switch coupled between the first totem pole driver and the DC level shifter, and the gate of the first switch is coupled to the first secondary winding; and the second circuit comprises a second switch coupled between the second totem pole driver and the DC level shifter, and the gate of the second switch is coupled to the second secondary winding.

13. The DC-DC converter as recited in claim 12 wherein the first switch and second switch are MOSFETs.

14. The DC-DC converter as recited in claim 12 wherein the first switch and second switch are n-channel transistors.

15. The DC-DC converter as recited in claim 11 wherein:

the first circuit comprises a first switch coupled between the gate of the first synchronous rectifier and a ground, and the gate of the first switch is coupled to the first secondary winding; and the second circuit comprises a second switch coupled between the gate of the second synchronous rectifier and the ground, and the gate of the second switch is coupled to the second secondary winding.

16. The DC-DC converter as recited in claim 15 wherein the first switch and second switch are MOSFETs.

17. The DC-DC converter as recited in claim 15 wherein the first switch and second switch are p-channel transistors.

18. A circuit for use in a DC-DC converter having a first secondary winding coupled to a first synchronous rectifier and a second secondary winding coupled to a second synchronous rectifier, the circuit comprising:

a first circuit coupled to the first secondary winding and the first synchronous rectifier, the first circuit turning the first synchronous rectifier off when a negative current is present in the first secondary winding and the first synchronous rectifier is on; and a second circuit coupled to the second secondary winding and the second synchronous rectifier, the second circuit turning the first synchronous rectifier off when the negative current is present in the second secondary winding and the second synchronous rectifier is on.

19. The circuit as recited in claim 18 wherein:

the first circuit comprises a first switch coupled between the gate of the first synchronous rectifier and a ground, and the gate of the first switch is coupled to the first secondary winding; and the second circuit comprises a second switch coupled between the gate of the second synchronous rectifier and the ground, and the gate of the second switch is coupled to the second secondary winding.

20. The circuit as recited in claim 19 wherein the first switch and second switch are MOSFETs.

21. The circuit as recited in claim 19 wherein the first switch and second switch are p-channel transistors.

22. The circuit as recited in claim 18 wherein the DC-DC converter also has a DC level shifter, a first totem pole driver coupled to the first synchronous rectifier and a second totem pole driver coupled to the second synchronous rectifier, and wherein:

the first circuit comprises a first switch coupled between the first totem pole driver and the DC level shifter, and the gate of the first switch is coupled to the first secondary winding; and the second circuit comprises a second switch coupled between the second totem pole driver and the DC level shifter, and the gate of the second switch is coupled to the second secondary winding.

23. The circuit as recited in claim 22 wherein the first switch and second switch are MOSFETs.

24. The circuit as recited in claim 22 wherein the first switch and second switch are n-channel transistors.

* * * * *